May 22, 1928.
E. A. ECKBERG
1,670,882
WHIRLPOOL WHEEL
Filed Dec. 2, 1926
2 Sheets-Sheet 1
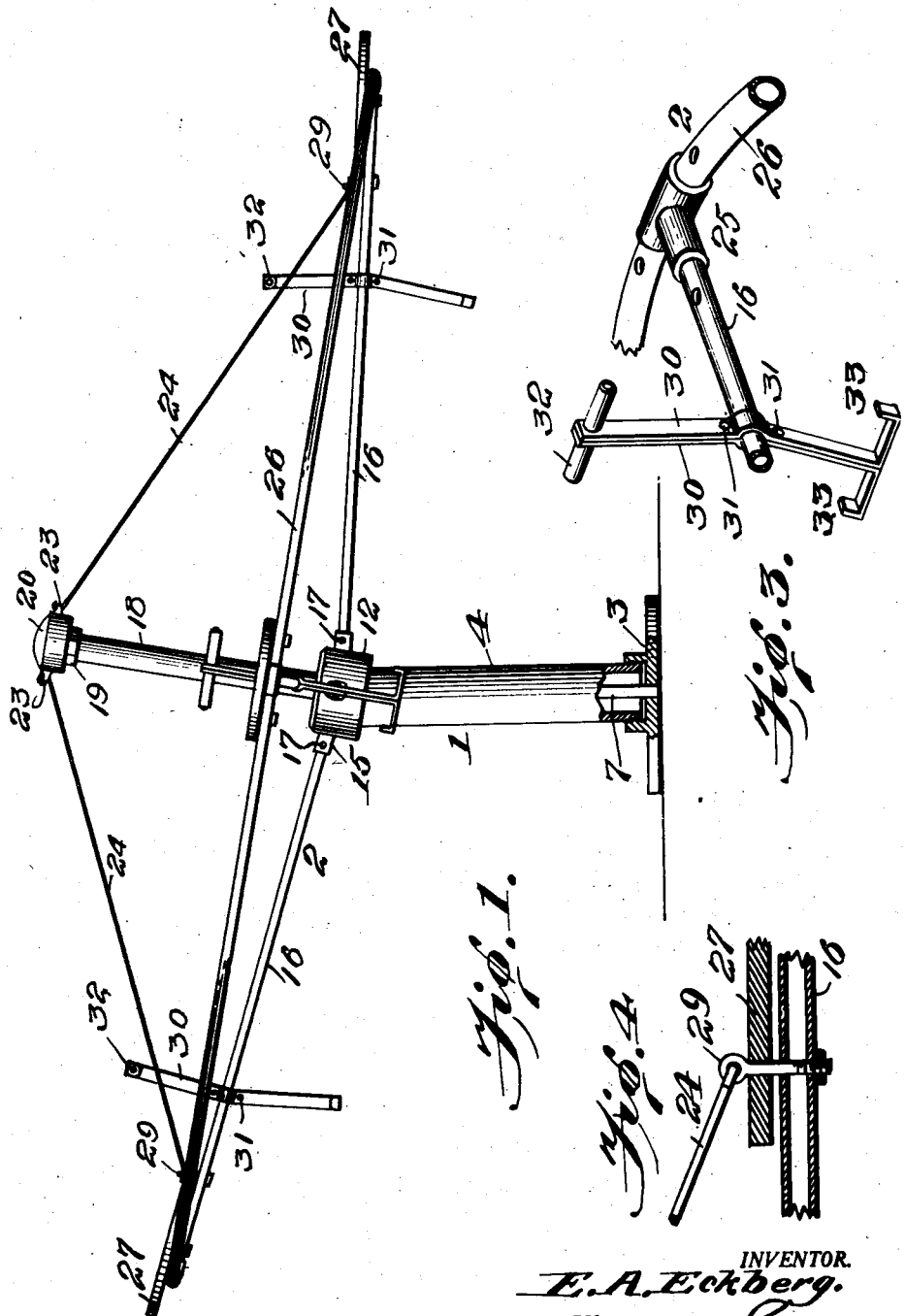
INVENTOR.
E. A. Eckberg.
BY
His ATTORNEYS.

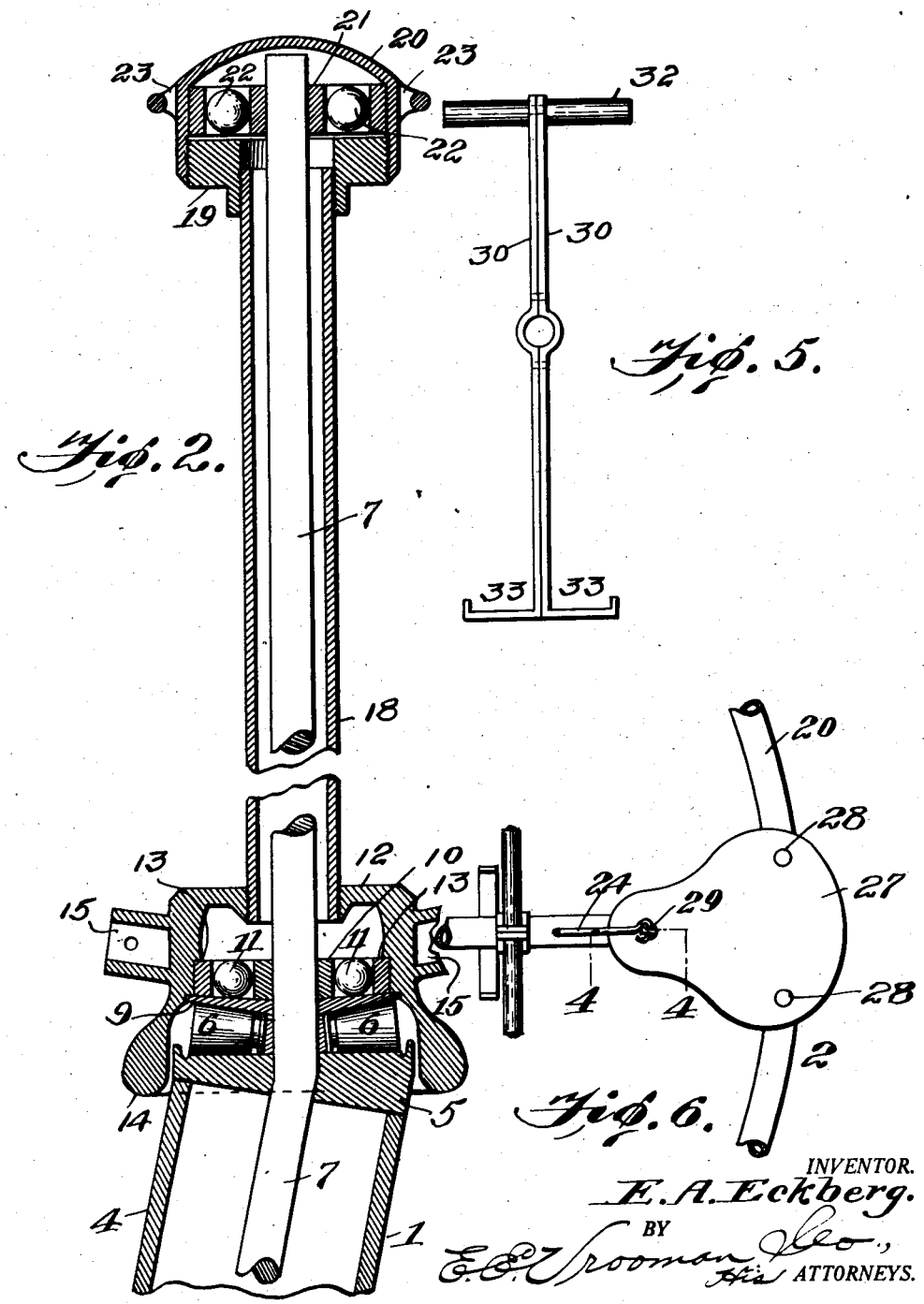

Patented May 22, 1928.

1,670,882

UNITED STATES PATENT OFFICE.

ERIC A. ECKBERG, OF OCONTO, WISCONSIN.

WHIRLPOOL WHEEL.

Application filed December 2, 1926. Serial No. 152,119.

This invention relates to an amusement apparatus, which I call a "whirlpool wheel."

The object of the invention is the construction of a simple and efficient apparatus for supporting people and allowing them to revolve around a fixed or stationary support, giving an exhilarating, as well as an entertaining effect.

Another object of the invention is the construction of a support upon which is mounted a ball bearing wheel, which wheel carries saddles, handles and stirrups, whereby persons, such as children, can be readily mounted on the wheel and revolve around the support in an entertaining and pleasing manner.

With these and other objects in view, my invention consists of certain novel constructions, combinations, and arrangements of parts as will be hereinafter fully described, illustrated in the accompanying drawings, and more particularly pointed out in the appended claims.

In the drawings:

Figure 1 is a view in side elevation of an apparatus constructed in accordance with the present invention.

Figure 2 is a fragmentary, vertical, sectional view of the apparatus, showing particularly the shaft.

Figure 3 is a fragmentary perspective view of the apparatus, showing the means comprising the handle and stirrup device.

Figure 4 is a sectional view taken on line 4—4, Figure 6.

Figure 5 is a view in elevation of the handle and stirrup device.

Figure 6 is a fragmentary top plan view of the apparatus, showing one of the seats and one of the handle and stirrup devices.

Referring to the drawings by numerals, 1 designates the support and 2 is the revoluble ball bearing wheel mounted thereon. The support 1 comprises a base plate 3 to which is secured the lower end of the lower tubular casing 4. Permanently secured to the upper end of casing 4 is plate 5; this plate 5 tapers in cross section to provide a horizontal upper face, upon which travels the conical roller bearings 6. It is to be noted that the casing 4 is inclined to a vertical plane, and vertical angle shaft 7 extends through plate 5 with its lower end secured in base plate 3 (Fig. 1). This shaft is bent just at plate 5 (Fig. 2), so that the wheel 2 is held in a tilted or inclined position, as shown in Figure 1 for the purpose hereinafter described. A collar 8 (Fig. 2) is seated in the inner grooved ends of bearings 6 for holding them in true position around shaft 7. A hardened tapering washer 9 is mounted on shaft 7 and rests upon roller bearings 6, this washer 9 being tapered in cross section for fitting perfectly upon the conical roller bearings 6. A ball race 10 rests upon the top of washer 9 with balls 11 therein. A hub 12 is placed upon the shaft 7 with a shoulder 13 resting against the top of ball race 10. This hub 12 is provided with a depending flange 14 that surrounds the upper end of casing 4 and also plate 5. The hub 12 is provided with spoke sockets 15, into which extend spokes 16. Suitable fastening means such as rivets 17 extend through spoke sockets 15 and the spokes 16, fastening the spokes to the hub.

An upper tubular casing 18 is threaded at its lower end into the top of hub 12, with the upper angularly disposed end of shaft 7 extending therethrough. A nut 19 is threaded on the upper end of casing 18 and threaded on this nut 19 is cap 20. A ball race 21 is mounted upon the upper end of shaft 7, within cap 20, and contains balls 22. On the outside of cap 20 are integral loops 23, to which are "hooked" the upper ends of guy wires 24. The cap 20 and casing 18 are accurately centered around the angle shaft 7, and are permitted to revolve freely and easily upon the shaft by reason of the ball bearing structure.

Each spoke 16 extends at its outer end into a T-shaped coupling 25. This T-shaped coupling is mounted upon rim 26. Over each coupling 25 is placed a seat 27. Suitable fastening means such as rivets 28 (Fig. 6) extend through the seat and fasten the same to the rim. An eye-bolt 29 (Fig. 4) extends through the narrow end of the seat and through a spoke. The lower end of each guy wire 24 is "hooked" in an eye-bolt 29.

On each spoke 16 contiguous to each seat 27 is mounted a handle and stirrup device (Figs. 3, 5 and 6). This device comprises a pair of metal strips 30 that surround at approximately their center the spoke 16. Rivets 31 extend through these strips 30, securely fastening the same upon the spoke. A handle bar 32 extends through the upper ends of the vertical strips 30. The lower ends of the strips 30 are bent laterally and at right angles with upturned ends, producing stirrups 33. Each rider, when seated on a seat 27 can place his feet in the stirrups 33, gripping the handle bar 32.

The operation is as follows:

A person seated on the seat in the highest position in Figure 1 leans back, causing an increase in weight at the highest point of the wheel. A person on the seat at the right in Figure 1 (which is the lowest seat) leans forward, causing a decrease in weight at the lowest point of the wheel. This causes the wheel to revolve, as the position of the persons are reversed, by reason of the wheel revolving, because a "pumping" action is created by the riders. That is, the riders at opposite points on the wheel assume different positions, one leaning forward and one leaning back, which results in a continuous rotation of the wheel.

It will be obvious that the diameter of the wheel can be increased to accommodate any number of seats, and all that is necessary to keep the wheel rotating is for the child at the highest point to lean outward or backward and the child at the lowest point to lean forward towards the center of the wheel.

It is to be understood that I have used the term "support" in a broad sense to designate the specific structure of shaft 7, and its co-operating parts, and I have used the term "wheel" in a broad sense to designate the hub 12, spokes 16, rim 26 etc.

While I have described the preferred embodiment of my invention and illustrated the same in the accompanying drawings, certain minor changes and alterations may appear to one skilled in the art to which this invention relates and I, therefore, reserve the right to make such changes or alterations as shall fairly fall within the scope of the appended claims.

What I claim is:

1. In an apparatus of the class described, the combination of a support provided at its upper end with a bearing plate, a shaft in said support and extending through said bearing plate, a plurality of roller bearings on said bearing plate around said shaft, said roller bearings provided with grooves near their inner ends, a locking collar in said grooves, a wheel provided with a hub surrounding said shaft, said hub including ball bearings and a tapering washer, said tapering washer seated upon said roller bearings, and body supporting means on said wheel.

2. In an apparatus of the class described, the combination of a support provided with a bearing plate, a shaft in said support and extending through and above said bearing plate, roller bearings on said bearing plate around said shaft, a wheel provided with a hub upon said shaft, said hub provided with an inner shoulder, a ball race within said hub against said shoulder, balls in said race, a tapering washer around said shaft against said roller bearings and beneath said ball race and balls, a ball bearing cap on the upper end of said shaft, guy wires connected to said cap and to said wheel, and body supporting means carried by said wheel.

3. In an apparatus of the class described, the combination with a support, of a rotatable wheel mounted upon said support, said wheel comprising a rim and spokes, T-shaped couplings on said rim and having the outer ends of the spokes extending therein, and seats above said couplings.

4. In an apparatus of the class described, the combination with a support, of a rotatable wheel carried by said support, a shaft extending above said support and through the central part of said wheel, a cap on the upper end of said shaft, said wheel including spokes, seats on said wheel at said spokes, eye-bolts extending through said seats and said spokes, and guy wires fastened at their upper ends to said cap and at their lower ends to said eye-bolts.

In testimony whereof I hereunto affix my signature.

ERIC A. ECKBERG.